March 1, 1927. G. A. MACREADY Re. 16,563

METHOD FOR MAKING PRODUCTION TESTS IN WELL DRILLING

Original Filed July 25, 1922

Witness:
W. H. Hall

Inventor.
George A. Macready.
by Hazard and Miller
Attorneys.

Reissued Mar. 1, 1927. Re. 16,563

UNITED STATES PATENT OFFICE.

GEORGE A. MACREADY, OF BAKERSFIELD, CALIFORNIA.

METHOD FOR MAKING PRODUCTION TESTS IN WELL DRILLING.

Original application filed July 25, 1922, Serial No. 577,433. Divided and application filed August 2, 1923, Serial No. 655,205. Original No. 1,522,197, dated January 6, 1925. Application for reissue filed February 8, 1926. Serial No. 86,945.

This is a division of my application Serial No. 577,433, filed July 25, 1922, for apparatus and method for making production tests in deep well drilling.

This invention relates to an improved method for facilitating the making of production tests of the lower portions of deep wells so as to determine the proper point at which the well is to be sealed off so as to cut off water from above the oil bearing strata.

It is an object of the present invention to provide a method for shutting off water and for maintaining a circulation in a deep well preparatory to and while making a production test so as to insure the recovery of the apparatus utilized by keeping it from being frozen in the well or jammed. A further object is to maintain a circulation in a well and apparatus and at the same time rotate a portion of the apparatus during the production test. Another object is to provide for the washing of the well by introducing clean water during the lowering of the testing apparatus utilized to a previously formed packer seat.

An object is to provide for the removal of the washings from the well during the lowering of the packer by passing the washings between inner and outer pipes of the apparatus to prevent scouring of the wall of the well above the packer and effect rotation of the outer pipe while the washing circulation is maintained. It is, therefore, broadly, an object of the invention to provide a washing circulation in which the discharge water from the well passes up in through the apparatus and not directly along the well wall.

Another object is to provide a method for facilitating production tests and for aiding in determining the permanent sealing zone and for maintaining circulation, and to provide for maintaining, by rotation, a free circulating pipe whereby the packer may be recovered after performance of function.

Other objects and advantages will be made manifest in the following specification of the preferred method comprising the present invention as effected by apparatus illustrated in the accompanying drawings, in which.

Figure 1:
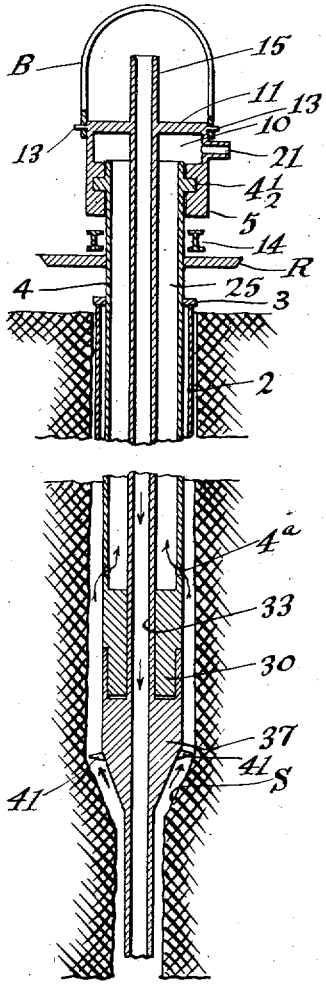
Figure 1 is a diagrammatic, vertical, longitudinal section of the apparatus in the step of being lowered to a temporary sealing position.

The present method may be practiced and effected by an apparatus illustrated in the accompanying drawings including a string of pipes and a packing section at the foot thereof and a swivel case at the head thereof, the pipes of which are capable of being bodily lowered, excepting at the swivel top mechanism, into the well casing 2, of suitable diameter, and at the top of which is a stuffing box 3, Figure 1, surrounding an outer pipe 4 of such diameter as to form a suitably sized cylindrical passageway within the casing 2.

Figure 2:
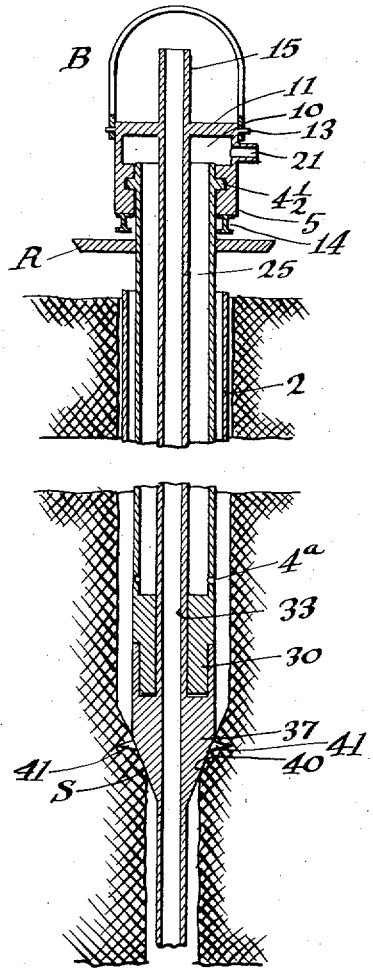
Fig. 2 is a longitudinal, vertical section of the apparatus in its effective sealing and circulation maintaining position.

The swivel case 5 is provided with an open upper end and forms a suitable chamber 10 which is closed as by a retaining cap 11 mounted on the rim of a case 5. This latter is shown as provided with diametrically opposite trunnions 13 to be engaged by any suitable elevating and suspending means for such period of time as may be necessary in lowering the apparatus into the well hole after which the case 5 is lowered to a suitable support, as for instance a set of supporting beams 14, Figure 2. This enables the throwing of the elevating mechanism of the string out of connection and facilitates the application of other appurtenances, as for instance to connect a small swivel of circulating pipes to the top of an inner pipe 15. This also provides for the step of bailing the well through the inner pipe 15 when the swivel case 5 is stationary on a permanent support.

A form of mechanical construction providing for the rotation of the top pipe section 4 includes an annular shoulder 4½ provided on this top section.

Circulation into and from the swivel case chamber 10 is provided by any suitable connection as a lateral coupling 21 which may be connected to the circulation pumps or otherwise as may be necessary so that water can be forced down in the outer pipe 4 or can flow up through the outer pipe 4.

The head pipe section 15 is of sufficiently small diameter to provide an ample passageway 25 within the pipe section 4.

The inner string of pipe 15 includes a foot section of hollow spindle 33. The hollow spindle passes down and rotatably fits in the bearing sleeve 30. The packer body 37 has an effective packing exterior lower portion which is preferably tapered so as to form a good seal upon a previously cut seat prepared therefor in the well hole.

From the above it will be seen that when the elevating and suspending bail device B, Fig. 1, is attached to the swivel case trunnion 13, the whole string of inner and outer pipes 15 and 4 are carried by the casing swivel and the outer pipe is adapted to be rotated by the usual rotary table R of a rotary drilling apparatus. While the string of packer elements are being lowered into the well, rotation can be maintained by the rotary table R of the outer pipe 4, while the inner pipe and the packer attached to the packing spindle 33 thereof being connected by a swivel joint at the bottom of the string in the bearing 30 does not rotate. During the lowering of the string, circulation is maintained by a flow of circulation fluid entering the top of the inner pipe 15, thence down to the bottom of the inner pipe where it discharges freely into the well and passes up to the surface thereby preventing the pipe from sticking. Just before seating of the packer, circulation is maintained as by a flow of water entering the top of the inner pipe 15, and thence down to the bottom of the inner pipe where it discharges freely into the well and passes up outside of the lower inner pipe and around the packer 37 as is shown in Fig. 1, and thence up until the water may find access into the outer pipe 4. This access and escape from the well hole is provided by a series of apertures 4ª in the lowermost section of the pipe 4 just above the foot swivel and bearing member 33. The stuffing box 3 being closed, prevents the water from going up outside of the pipe 4 thereby avoiding scouring the walls of the hole. The upwardly flowing water passes freely into the space between the inner pipe 15 and the outer pipe 4 and thus does not rise along the well wall and the scouring of the wall is prevented above the packer. The water entering the pipe 4 passes to the top thereof and escapes through the lateral connection 21 as indicated in Fig. 1.

When the packing string has been lowered to the necessary position, the packing facing 40 engages the seat S provided therefor in the well hole and becomes fixed and solidly seated and is held against rotation upon the seat or by the interlocking of the holding prongs 41 engaging in the wall. As soon as the packer has become seated, it will be seen that upflow from below is prevented except through the innermost or central pipe 15. This is open continuously from top to bottom and provides for the bailing of the bottom of the well and for such other steps as may be taken in the production test.

When the packer is seated, mud circulation may be maintained from the pump system by forcing the fluid into port 21 of the swivel case at the head of the well wall when this is seated on its permanent supports 14. The fluid is forced down through the space between the inside pipe 15 and the outside pipe 4 and discharges outwardly through the openings 4ª and passes upwardly along the surface of the well and plasters the wall above the packer. This fluid circulation prevents the pipe sticking or freezing to the walls of the well. The upwardly flowing circulating mud is discharged through the well casing at the head of the well.

It will be seen also that the weight of the columns of pipes upon the seated packer can be readily regulated by the amount of weight of the swivel head and apparatus that is superimposed on the permanent supports 14 upon which the swivel case is lowered after the packer has become seated. The advantage of this is that considerable strain is removed from the packer and also from the string of pipe sections and their joints throughout the string.

This method provides for the constant motion of the outer pipe string 4 while it is being lowered into the hole and after the packer has become firmly seated and provides also for the downward or upward circulation or flow of liquid in the space between the two pipes, and also between the outer pipe and well wall, and all of this with the object of insuring the possibility of recovering the apparatus from the well.

Further embodiments, modifications and variations may be resorted to within the principle of the invention.

What is claimed is:

1. The method of making production tests in deep wells which comprises lowering a tube into the well, forming a seal between the tube and the well wall so as to prevent fluid above the seal from entering the tube below the seal, withdrawing a sample of fluid from below the seal through the tube, preventing the tube from becoming stuck in the well while taking the sample by moving a second tube in the well above the seal about the first tube, and withdrawing the tubes from the well after the sample has been taken.

2. The method of making production tests in deep wells which comprises lowering a tube into the well, forming a seal between the tube and the well wall so as to prevent fluid above the seal from entering the tube below the seal, withdrawing a sample of fluid from below the seal through the tube, preventing the tubing from becoming stuck in the well while taking the sample by rotating a second tube in the well above the seal about the first tube, and withdrawing the tubes from the well after the sample has been taken.

3. The method of making production tests in deep wells which comprises lowering a tube into the well, forming a seal between the tube and the well wall so as to prevent fluid above the seal from entering the tube below the seal, withdrawing a sample of fluid from below the seal, through the tube, preventing the tube from becoming stuck in the well while taking the sample by moving a second tube in the well above the seal about the first tube, causing fluid to flow through the second tube and about it, and withdrawing the tubes from the well after the sample has been taken.

4. The method of making production tests in deep wells which comprises lowering a tube into the well, forming a seal between the tube and the well wall so as to prevent fluid above the seal from entering the tube below the seal, withdrawing a sample of fluid from below the seal through the tube, preventing the tube from becoming stuck in the well while taking the sample by rotating a second tube in the well above the seal about the first tube, causing fluid to flow through the second tube and about it, and withdrawing the tubes from the well after the sample has been taken.

5. The method of making production tests in deep wells which comprises lowering a tube into the well, forming a seal between the tube and the well wall to prevent fluid in the well above the seal from entering the tube below the seal, withdrawing a sample of fluid from below the seal through the tube, and preventing the tube from becoming stuck in the well by defining a passage in the well above the seal leading down about the tube to a point near the seal and causing fluid to flow through said passage and about it.

6. The method of making production tests in wells which comprises enlarging the upper part of the well to cause the well to have at least two different diameters, lowering a tube into the lower part of the well having the smaller diameter, forming a seal between the tube and the well wall which is below the upper part of the well, having the larger diameter, withdrawing a sample of fluid from below the seal through the tube, preventing the tube from becoming stuck in the well while obtaining the sample by moving a second tube in the upper part of the well above the seal having a diameter approximately equal to the diameter of the seal, thus preventing the walls of the well from caving in to a size smaller than the seal can be withdrawn through, and removing the tubes and seal from the well after obtaining the sample.

7. The method of making production tests in deep wells which consists of lowering a tube into a well, forming a seal between the tube and the well wall so that fluid above the seal cannot enter the tube below the seal, withdrawing a sample of fluid from below the seal through the tube, providing a cylindrical partition in the well about the tube above the seal intermediate the tube and well wall, and preventing the tube from becoming stuck in the well while obtaining the sample by forcing fluid downwardly between the partition and tube causing it to pass out of the partition above the seal and upwardly between the partition and the well wall.

8. The method of making production tests in deep wells which consists of lowering a tube into a well, forming a seal between the tube and the well wall so that fluid above the seal cannot enter the tube below the seal, withdrawing a sample of fluid from below the seal through the tube, providing a cylindrical partition in the well about the tube above the seal intermediate the tube and well wall, and preventing the tube from becoming stuck in the well while obtaining the sample by simultaneously moving said partition and forcing fluid downwardly between the partition and tube and causing it to pass out of the partition above the seal and upwardly between the partition and well wall.

9. The method of making production tests in deep wells which consists of lowering a tube into a well, forming a seal between the tube and the well wall so that fluid above the seal cannot enter the tube below the seal, withdrawing a sample of fluid from below the seal through the tube, providing a cylindrical partition in the well about the tube above the seal intermediate the tube and well wall, and preventing the tube from becoming stuck in the well while obtaining the sample by simultaneously rotating said partition and forcing fluid downwardly between the partitions and tube and causing it to pass out of the partition above the seal and upwardly between the partition and well wall.

10. The method of making production tests in deep wells which comprises lowering a tube into the well, forming a seal between the tube and the well wall so as to prevent fluid above the seal from entering the tube below the seal, withdrawing a sample of fluid from below the seal through the tube, preventing the well from becoming constricted by cave-ins above the seal by moving a second tube in the well above the seal having a diameter approximately equal to the diameter of the seal, and withdrawing the tubes from the well after the sample has been taken.

In testimony whereof I have signed my name to this specification.

GEORGE A. MACREADY.